United States Patent
Miguirditchian et al.

(10) Patent No.: US 8,778,287 B2
(45) Date of Patent: Jul. 15, 2014

(54) POOLED SEPARATION OF ACTINIDES FROM A HIGHLY ACIDIC AQUEOUS PHASE USING A SOLVATING EXTRACTANT IN A SALTING-OUT MEDIUM

(75) Inventors: Manuel Miguirditchian, Avignon (FR); Pascal Baron, Bagnols sur Ceze (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 1301 days.

(21) Appl. No.: 12/445,748

(22) PCT Filed: Oct. 22, 2007

(86) PCT No.: PCT/EP2007/061287
§ 371 (c)(1),
(2), (4) Date: Sep. 23, 2010

(87) PCT Pub. No.: WO2008/049807
PCT Pub. Date: May 2, 2008

(65) Prior Publication Data
US 2011/0002823 A1    Jan. 6, 2011

(30) Foreign Application Priority Data

Oct. 23, 2006 (FR) ........................ 06 54444

(51) Int. Cl.
*B01D 11/00* (2006.01)
(52) U.S. Cl.
USPC .......... 423/20; 423/9; 423/11; 423/12; 423/3; 423/15
(58) Field of Classification Search
USPC ................... 423/9, 11, 12, 3, 15, 20
See application file for complete search history.

(56) References Cited

U.S. PATENT DOCUMENTS

| 4,572,802 | A | 2/1986 | Hubert et al. |
| 5,223,232 | A | 6/1993 | Cuillerdier et al. |
| 5,708,958 | A | 1/1998 | Koma et al. |
| 7,622,090 | B2 * | 11/2009 | Dinh et al. ................ 423/8 |
| 2004/0124141 | A1 * | 7/2004 | Baron et al. .............. 210/634 |
| 2005/0288542 | A1 * | 12/2005 | Grandjean et al. ........ 588/313 |

FOREIGN PATENT DOCUMENTS

| EP | 0 110 789 A1 | 6/1984 |
| EP | 0 505 277 A1 | 9/1992 |
| FR | 2 674 256 A1 | 3/1991 |
| FR | 2 738 663 A1 | 11/1996 |
| FR | 2 810 679 A1 | 12/2001 |
| FR | 2 845 616 A1 | 4/2004 |

OTHER PUBLICATIONS

P. Baron et al. Separation of the Minor Actinides:The Diamex-Sanex Concept, pp. 1-8.

* cited by examiner

*Primary Examiner* — Melissa Stalder
(74) *Attorney, Agent, or Firm* — Miles & Stockbridge P.C.

(57) ABSTRACT

The invention relates to a process which makes it possible to separate together all the actinide(III), (IV), (V) and (VI) entities present in a highly acidic aqueous phase from fission products, in particular lanthanides, also present in this phase by using a solvating extractant in a salting-out medium.
Applications: reprocessing of irradiated nuclear fuels, in particular for recovering plutonium, neptunium, americium, curium and possibly uranium, present in the form of traces, in a pooled but selective fashion with regard to lanthanides, from a solution for the dissolution of an irradiated nuclear fuel, downstream of a cycle for the extraction of uranium.

29 Claims, 2 Drawing Sheets

POOLED SEPARATION OF ACTINIDES FROM A HIGHLY ACIDIC AQUEOUS PHASE USING A SOLVATING EXTRACTANT IN A SALTING-OUT MEDIUM

TECHNICAL FIELD

The present invention relates to a process which makes it possible to separate together all the actinide(III), (IV), (V) and (VI) entities present in a highly acidic aqueous phase from fission products, in particular lanthanides, also present in this phase by using a solvating extractant in a salting-out medium.

This process is capable of being used in the field of the reprocessing of irradiated nuclear fuels, in particular for recovering plutonium, neptunium, americium, curium and possibly uranium, in pooled but selective fashion with regard to the fission products, from a solution for the dissolution of an irradiated nuclear fuel, downstream of a cycle for the extraction of uranium.

PRIOR ART

The strategy for the reprocessing of irradiated nuclear fuels, as applied currently in modern reprocessing plants, such as the UP3 and UP2-800 plants at the Areva NC La Hague site in France or the Rokkasho plant in Japan, is based on the PUREX process, which makes it possible to separate uranium and plutonium, not only from the other chemical elements present in these fuels but also from one another, and to purify them.

From the viewpoint of carrying out an exhaustive separation of long-lived radionuclides, the proposal has been made, on the one hand, to modify the PUREX process so that it makes it possible to also isolate neptunium and, on the other hand, to use, downstream of the PUREX process, processes which make it possible to separate americium, curium and the lanthanides from the remainder of the fission products, then americium and curium from the lanthanides and, finally, americium from curium.

Two processes, which are respectively known under the SETFICS and SANEX names, have been proposed in particular for separating americium and curium (which are found in the III oxidation state in the raffinates resulting from the PUREX process) from the lanthanides (which are also in the III oxidation state in these raffinates).

The SETFICS process, which is described in French Patent Application 2 738 663 [1], consists:

in coextracting americium and curium, in conjunction with the lanthanides, from an aqueous nitric acid phase of high acidity using an organic phase comprising, as extractant, a mixture of octyl(phenyl)(N,N-diisobutyl-carbamoylmethyl)phosphine oxide (or CMPO) and tri (n-butyl) phosphate (or TBP), and then after a reduction in the acidity of the organic phase obtained on conclusion of this coextraction, in selectively stripping americium and curium from the organic phase using an aqueous nitric acid phase of low acidity comprising, on the one hand, an agent capable of complexing americium and curium and of thus causing these elements to migrate into the aqueous phase and, on the other hand, nitrate ions in order to retain the lanthanides in the organic phase.

The SANEX process, which is described by Baron P. et al. in *Proceedings of the International Conference on Back-End of the Fuel Cycle: From Research to Solutions, GLOBAL '01*, Paris, France, 9-13 Sep. 2001, published by INIS-FR-1108 [2], consists:

in coextracting the actinides and the lanthanides from an aqueous nitric acid phase of high acidity using an organic phase comprising two extractants operating in unconnected chemical regions, namely a first extractant of solvating extractant type which is capable of jointly extracting americium, curium and the lanthanides from an aqueous nitric acid phase of high acidity and a second extractant of cationic exchanger type which is capable of extracting these elements from an aqueous nitric acid phase of low acidity, and then in stripping americium and curium from the organic phase obtained on conclusion of this coextraction using an aqueous phase which is weakly acidic, in order for the lanthanides to be retained in the organic phase, but which comprises an agent capable of selectively complexing americium and curium, in order to cause these two elements to migrate into this aqueous phase.

In order to limit the risk of proliferation related to the existence of plutonium isolated from the PUREX process and from the viewpoint of in-line manufacture of future nuclear fuels, attempts are currently being made to develop processes which make it possible to recover, from a solution for the dissolution of an irradiated nuclear fuel freed beforehand from its uranium, all the other actinides present in this solution, that is to say plutonium, neptunium, americium and curium, in a pooled but selective fashion with regard to the fission products.

The development of such processes has to take into account a number of constraints which do not exist in the case of the separation of actinide(III) entities from lanthanide(III) entities and in particular the fact that, on the one hand, plutonium, neptunium, americium and curium occur at different oxidation states in solution, ranging from the III oxidation state for americium and curium to the VI oxidation state for plutonium and neptunium, and that, on the other hand, a solution for the dissolution of an irradiated nuclear fuel which has been freed only from its uranium exhibits a very high total content of cations (at least 0.1 mol/l), in particular of plutonium.

ACCOUNT OF THE INVENTION

A specific subject-matter of the present invention is a process for the pooled separation of actinide(III), (IV), (V) and (VI) entities present in a highly acidic aqueous phase also comprising fission products, including lanthanides and yttrium, which process comprises the following steps:

a) the coextraction of the actinides, the lanthanides, yttrium and optionally a few other fission products from the highly acidic aqueous phase by bringing this phase into contact with a water-immiscible organic phase which comprises at least one solvating extractant chosen from diglycolamides and malonamides in an organic diluent; and b) the selective stripping of the actinides from the organic phase by bringing this organic phase into contact with a weakly acidic aqueous phase comprising at least one complexing agent and nitrate ions.

In that which precedes and that which follows, the expressions "highly acidic aqueous phase" and "weakly acidic aqueous phase" are as usually accepted in the field of the reprocessing of irradiated nuclear fuels, namely that a highly acidic aqueous phase generally exhibits a pH at most equal to 0, which corresponds, for example, to an aqueous nitric acid solution with a molarity at least equal to 1, while a weakly acidic aqueous phase generally exhibits a pH of strictly greater than 0, which corresponds, for example, to an aqueous nitric acid solution with a molarity of strictly less than 1.

As mentioned above, the organic phase used in step a) comprises at least one solvating extractant chosen from diglycolamides and malonamides (also known as propanediamides) in an organic diluent.

Use may in particular be made, as diglycolamides, of those described in French Patent Application 2 810 679 [3]. These diglycolamides correspond to the formula (I) below:

$$R^1(R^2)N-C(O)-CH_2-O-CH_2-C(O)-N(R^3)R^4 \qquad (I)$$

in which $R^1$ to $R^4$, which can be identical or different, are alkyl groups.

Preference is given, among these, to the use of those in which said alkyl groups comprise from 3 to 12 carbon atoms, such as N,N,N',N'-tetraoctyl-3-oxa-pentanediamide (or TODGA) and N,N,N',N'-tetradecyl-3-oxapentanediamide (or TDDGA), TODGA being very particularly preferred.

Use may in particular be made, as malonamides, of those described in French Patent Application 2 674 256 [4]. These malonamides correspond to the formula (II) below:

$$R^5(R^6)N-C(O)-CH(R^7)-C(O)-N(R^6)R^5 \qquad (II)$$

in which:
$R^5$ and $R^6$, which can be identical or different, represent a linear or branched alkyl group comprising from 1 to 25 carbon atoms or a group of formula (III) below:

$$-(CH_2)_n-Z-(CH_2)_m-O-R^8 \qquad (III)$$

in which $R^8$ is an alkyl group comprising from 1 to 13 carbon atoms, n is an integer ranging from 0 to 6, Z is a single bond or an oxygen atom and m is an integer ranging from 1 to 6, provided that Z is a single bond when n is equal to 0; while $R^7$ represents an alkyl radical comprising from 12 to 25 carbon atoms or a group of formula (III) above in which $R^8$, n, Z and m have the same meanings as above.

Preference is given, among these malonamides, to the use of those in which $R^7$ represents a $C_{12}$ to $C_{25}$ alkyl radical, such as N,N'-dimethyl-N,N'-dibutyltetradecylmalonamide (or DMDBTDMA) and N,N'-dimethyl-N,N'-dibutyldodecylmalonamide (or DMDBDDEMA), and of those in which $R^7$ represents a group of formula: $-(CH_2)_m-O-R^8$ in which $R^8$ and m have the same meanings as above, such as N,N'-dimethyl-N,N'-dioctylhexylethoxymalonamide (or DMDOHEMA).

With regard to the organic diluent, it can be chosen from the various hydrocarbons which have been proposed for carrying out liquid-liquid extractions, such as toluene, xylene, t-butylbenzene, triisopropylbenzene, kerosene and linear or branched dodecanes, such as n-dodecane, or hydrogenated tetrapropylene (HTP), and the mixtures of these hydrocarbons.

Whatever the solvating extractant used, it is possible, in accordance with the invention, to increase the loading capacity of the organic phase used in step a), that is to say the maximum content of cations which this phase can exhibit without a third phase being formed by phase separation, by adding, to this organic phase, a dialkylmonoamide which is at least as lipophilic as the solvating extractant, such as, for example, N,N-dihexyloctanamide (or DHOA), or else a trialkyl phosphate, such as tri(n-butyl)phosphate (or TBP). In this case, the concentration of the dialkylmonoamide or of the trialkyl phosphate in the organic phase is preferably of the order of 0.3 to 1 mol/l.

In step a), the coextraction of certain fission products (other than the lanthanides and yttrium), such as, for example, zirconium, strontium, ruthenium, palladium and molybdenum, and also that of other cations regarded as undesirable, can advantageously be avoided or at the very least be limited by adding a complexing agent and better still a mixture of several complexing agents to the highly acidic aqueous phase.

This or these complexing agents can be chosen in particular from pyridinepolycarboxylic acids (for example, 2,6-pyridinedicarboxylic acid), polyaminocarboxylic acids (for example, N-(2-hydroxy-ethyl)ethylenediaminetriacetic acid or HEDTA, diethylenetriaminepentaacetic acid or DTPA), carboxylic acids, hydroxycarboxylic acids, hydrophilic polypyridines, dithiophosphonic acids, amines, polyazines grafted with alkyl chains comprising from 1 to 8 carbon atoms, hydroxyoximes, sulphonic acids, hydroxamic acids and β-diketones.

Furthermore, step a) can additionally comprise the washing of the organic phase obtained on conclusion of the coextraction with a highly acidic aqueous phase, for example an at least 1M nitric acid solution, advantageously comprising one or more complexing agents of the type of those mentioned above, in order to withdraw, from this organic phase, the fission products and other undesirable cations which may have followed the actinides, the lanthanides and yttrium into the organic phase.

In accordance with the invention, it is also possible to add, to the highly acidic aqueous phase, at least one reducing agent capable of reducing neptunium(V) and plutonium(IV) to neptunium(IV) and plutonium(III) respectively and of stabilizing them in these forms, in order to render them more extractable by the organic phase. Mention may in particular be made, as reducing agents capable of being used, of alkylated derivatives of hydrazine, alkylated derivatives of hydroxylamine and ferrous sulphamate.

As indicated above, step b) of the process of the invention is carried out by using a weakly acidic aqueous phase which comprises at least one complexing agent, the role of which is to selectively complex the actinides (this selectivity being understood with regard to the lanthanides and yttrium) in order to cause them to pass from the organic phase into this aqueous phase, and also nitrate ions, the role of which is to keep the lanthanides and yttrium in the organic phase, so that only the actinides are stripping from said organic phase.

This weakly acidic aqueous phase preferably exhibits a pH of 1 to 4 and better still of the order of 2, which pH is adjusted by addition of a base of the sodium hydroxide, hydrazine, hydroxylamine or tetramethylammonium hydroxide type.

With regard to the concentration of nitrate ions in this phase, it is preferably from 1 to 5 mol/l and better still from 1 to 4 mol/l.

The complexing agent used in step b) can be chosen from all the complexing agents mentioned above, in particular from polyaminocarboxylic acids, such as HEDTA or DTPA, while the nitrate ions can originate from a salt of an alkali metal, such as sodium nitrate or lithium nitrate, or of an organic amine, such as hydroxylamine nitrate (also known as hydroxylammonium nitrate) or hydrazine nitrate (also known as hydrazinium nitrate).

According to a first embodiment of the process of the invention, step b) is carried out immediately after step a), in which case the weakly acidic aqueous phase additionally comprises a buffer, such as a hydroxycarboxylic acid, for example glycolic acid or citric acid, in order for it to be able to retain substantially the same pH throughout the duration of step b) despite the acidity exhibited by the organic phase obtained on conclusion of step a).

According to a second embodiment of the process according to the invention, the process comprises, between step a)

and step b), a step of stripping the acid present in the organic phase obtained on conclusion of step a) by bringing this phase into contact with a weakly acidic aqueous phase, for example with a pH of 1 to 3, comprising from 0.1 to 3 mol/l of nitrate ions of the type of those mentioned above, in which case it is not necessary to provide for the presence of a buffer in the weakly acidic aqueous phase used in step b).

According to a preferred arrangement of this second embodiment, the step of stripping the acid is coupled to step a), that is to say that it is carried out in the same column or battery of extractors as that in which step a) takes place.

When the organic phase is intended to be reused, in particular for carrying out a fresh pooled separation of actinides, then the process additionally comprises a step consisting in stripping the lanthanides and yttrium from the organic phase, which step is carried out after step b).

To do this, the organic phase is brought into contact with an acidic aqueous phase, preferably devoid of any complexing agent, such as a dilute nitric acid solution, for example with a molarity ranging from 0.01 to 0.1.

However, it is also possible to use a (weakly or highly) acidic aqueous solution comprising a complexing agent, such as a polyaminocarboxylic acid, a phosphorus acid, a sulphonic acid or a hydrophilic polyazine.

When the organic phase is intended to be reused, the process according to the invention comprises, in last place, a step of treatment of the organic phase which is intended to remove therefrom the decomposition products and the impurities which have accumulated therein during the preceding steps.

This treatment step can comprise, as already described in the prior art, one or more operations in which the organic phase is washed with aqueous phases comprising compounds capable of selectively complexing the decomposition products and the impurities present therein and of thus making possible their transfer into these phases, without, however, stripping the first and second extractants, and one or more filtration operations, if the organic phase includes a precipitate.

A subject-matter of the invention is also a process for the reprocessing of an irradiated nuclear fuel, which comprises the implementation of a process for the pooled separation of actinide(III), (IV), (V) and (VI) entities as defined above, and its use in recovering plutonium, neptunium, americium, curium and possibly uranium, in pooled but selective fashion with regard to the fission products, from a solution for the dissolution of an irradiated nuclear fuel, downstream of a cycle for the extraction of uranium.

A better understanding of the invention will be obtained on reading the examples which follow and which refer to the appended figures.

It is obvious that these examples are given only by way of illustrations of the subject-matter of the invention and should not under any circumstances be interpreted as a limitation on this subject-matter.

In these figures, the rectangles referenced 1, 2, 3, 4 and 5 schematically represent multistage extractors conventionally used in the reprocessing of irradiated nuclear fuels, such as, for example, extractors composed of batteries of mixers-settlers, where one mixer combined with one settler represents one theoretical stage.

The flows of solvent phase entering and exiting from these extractors are symbolized by a double line, while the flows of aqueous phase entering and exiting from these extractors are symbolized by a single line.

DETAILED ACCOUNT OF THE INVENTION

Example 1

Detailed Account of Embodiments of the Process of the Invention

Figure 1:
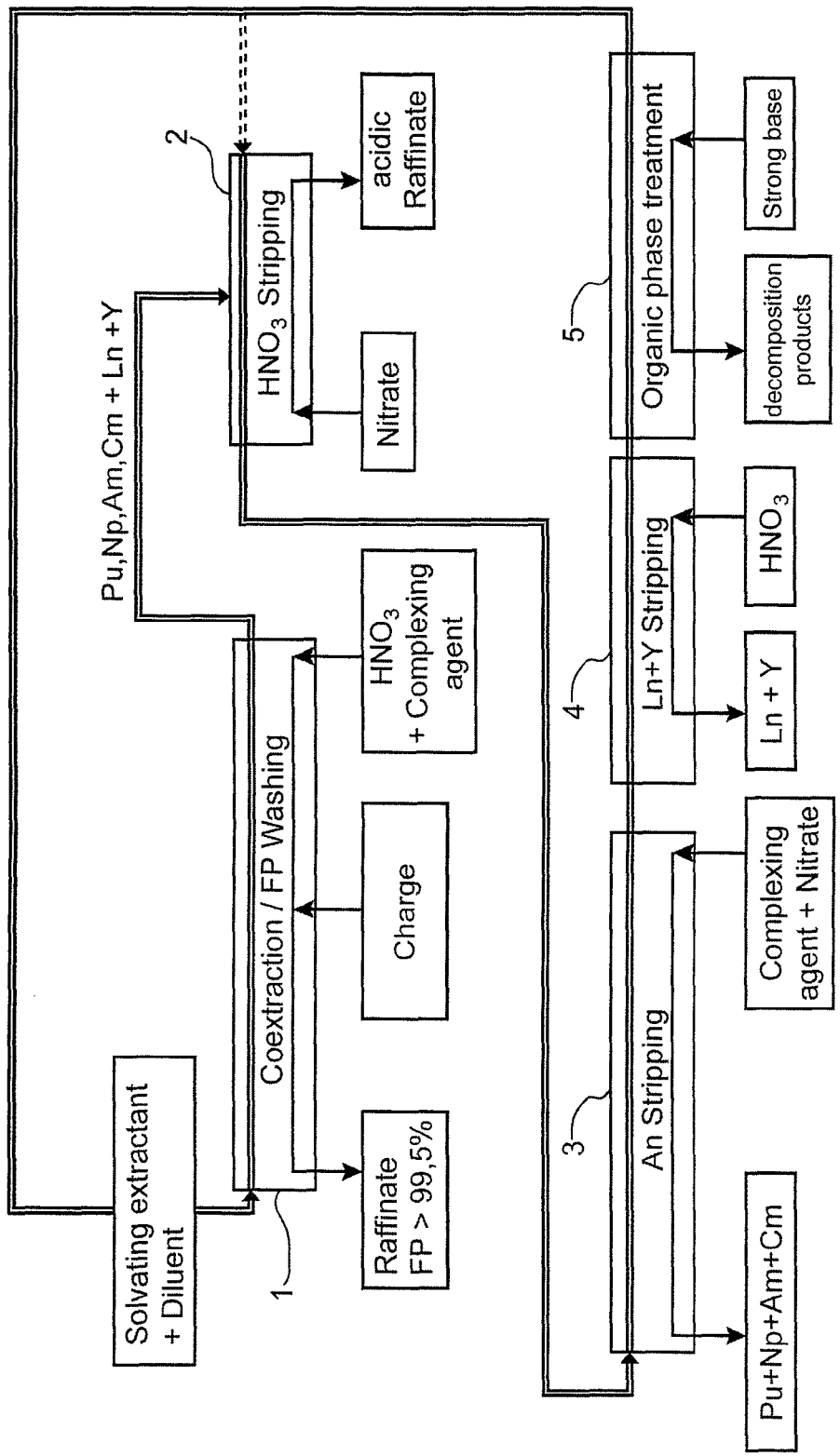
FIG. 1 is a flowsheet of an embodiment of the process of the invention.

Reference is made to FIG. 1, in which is schematically illustrated an embodiment of the process of the invention designed to separate in pooled fashion plutonium, neptunium, americium, curium and uranium, possibly present in the form of traces, from fission products, starting from a solution for the dissolution of an irradiated nuclear fuel after extraction of the uranium present therein.

This solution is a highly acidic aqueous solution, for example a 2 to 5M nitric acid solution, which comprises actinides, lanthanides (lanthanum, cerium, praseodymium, neodymium, samarium, europium, and the like), fission products which are not lanthanides, such as yttrium, molybdenum, zirconium, rubidium, ruthenium, caesium, barium, palladium, strontium and rhodium, and cations which are not fission products, such as iron and chromium.

In this exemplary embodiment, the process successively comprises the following steps:

a step comprising the coextraction of the actinides, the lanthanides and yttrium into an organic phase and then the washing of this organic phase in order to withdraw therefrom fission products and other undesirable cations which may have followed the actinides, the lanthanides and yttrium during the coextraction (this step being recorded as "Coextraction/FP washing" in FIG. 1);

a step of stripping the nitric acid from the organic phase (recorded as "$HNO_3$ stripping" in FIG. 1);

a step of selective by stripping the actinides from the organic phase thus deacidified (recorded as "An stripping" in FIG. 1);

a step of stripping the lanthanides and yttrium from the organic phase (recorded as "Ln+Y stripping" in FIG. 1); and a step of treating the organic phase (recorded as "Organic phase treatment" in FIG. 1).

In the first step (Coextraction/FP washing), a water-immiscible organic phase, which comprises at least one solvating extractant chosen from diglycolamides and malonamides, for example TODGA, in an organic diluent, is first of all brought into contact with the highly acidic aqueous solution from which it is desired to coextract the actinides, the lanthanides and yttrium and which is referred to as "Charge" in FIG. 1.

A dialkylmonoamide which is at least as lipophilic as the solvating extractant, such as DHOA, or else a trialkyl phosphate, such as TBP, can also be present in the organic phase in order to increase its loading capacity.

It is possible to add, to the highly acidic aqueous solution, a complexing agent or, better still, several complexing agents, in order to prevent or at the very least limit the coextraction of certain fission products, such as zirconium, strontium, ruthenium, palladium and molybdenum, or of other undesirable cations, and also one or more reducing agents capable of reducing neptunium(V) to give neptunium(IV) and of stabilizing it in this form.

This or these complexing agents can be chosen in particular from pyridinepolycarboxylic acids, such as 2,6-pyridinedicarboxylic acid, which are used at a concentration, for example, of 0.3 mol/l, and polyaminocarboxylic acids, such as N-(2-hydroxyethyl)-ethylenediaminetriacetic acid (HEDTA) or diethylenetriaminepentaacetic acid (DTPA), which are used at a concentration, for example, of 0.01 mol/l, carboxylic acids, such as oxalic acid, and hydroxycarboxylic acids, such as citric acid. However, they can also be chosen from amines, polyazines, hydroxyoximes, sulphonic acids, hydroxamic acids and β-diketones.

The reducing agent or agents can, for their part, be chosen from alkylated derivatives of hydrazine, alkylated derivatives of hydroxylamine and ferrous sulphamate.

Then, for the FP washing, the organic phase is brought into contact with a highly acidic aqueous phase, for example a 1M nitric acid solution, which comprises one or more complexing agents of the type of those mentioned above.

On conclusion of this first step, there are thus obtained, on the one hand, an aqueous phase, which comprises the fission products which cannot be extracted by the organic phase and, on the other hand, an organic phase in which plutonium, neptunium, americium, curium, the possible traces of uranium, the lanthanides and yttrium are present.

In the second step ($HNO_3$ stripping), the organic phase is brought into countercurrentwise contact with a weakly acidic aqueous phase which comprises at least nitrate ions. Such an aqueous phase is, for example, a 0.1 to 3M aqueous hydroxylamine nitrate solution with a pH of 2.

In the third step (An stripping), the organic phase is brought into countercurrentwise contact with a weakly acidic aqueous phase, for example with a pH of 2, which simultaneously comprises at least one complexing agent and nitrate ions.

The complexing agent can in particular be a polyaminocarboxylic acid, such as HEDTA or DTPA, which is used at a concentration, for example, of 0.01 to 0.5 mol/l, while the nitrate ions are preferably the same as those used in the preceding step, which are then used at a concentration ranging from 1 to 4M.

There are thus obtained, on conclusion of this third step, an aqueous phase, in which plutonium, neptunium, americium, curium and possible traces of uranium occur, and an organic phase freed from these elements.

In the fourth step (Ln+Y stripping), the organic phase is brought into countercurrentwise contact with an acidic aqueous solution, the acidity of which lies within a pH range in which the extracting power of the organic phase is minimal with regard to lanthanides and yttrium. Such a solution is, for example, a 0.01 to 0.1M nitric acid solution.

There are thus obtained, on conclusion of this fourth step, an aqueous phase laden with lanthanides and yttrium and an organic phase freed from these elements.

Finally, in the fifth step, the organic phase is treated, for example by one or more washing operations with an aqueous solution of a strong base having a pH equal to or greater than 8, such as a 0.1 to 0.3M sodium carbonate or sodium hydroxide solution, and, if need be, with one or more filtrations, in the case of it including a precipitate, in order to free it from the decomposition products and impurities which have accumulated therein during the preceding steps.

Thus purified, the organic phase can be reused for the implementation of a following cycle.

Figure 2:
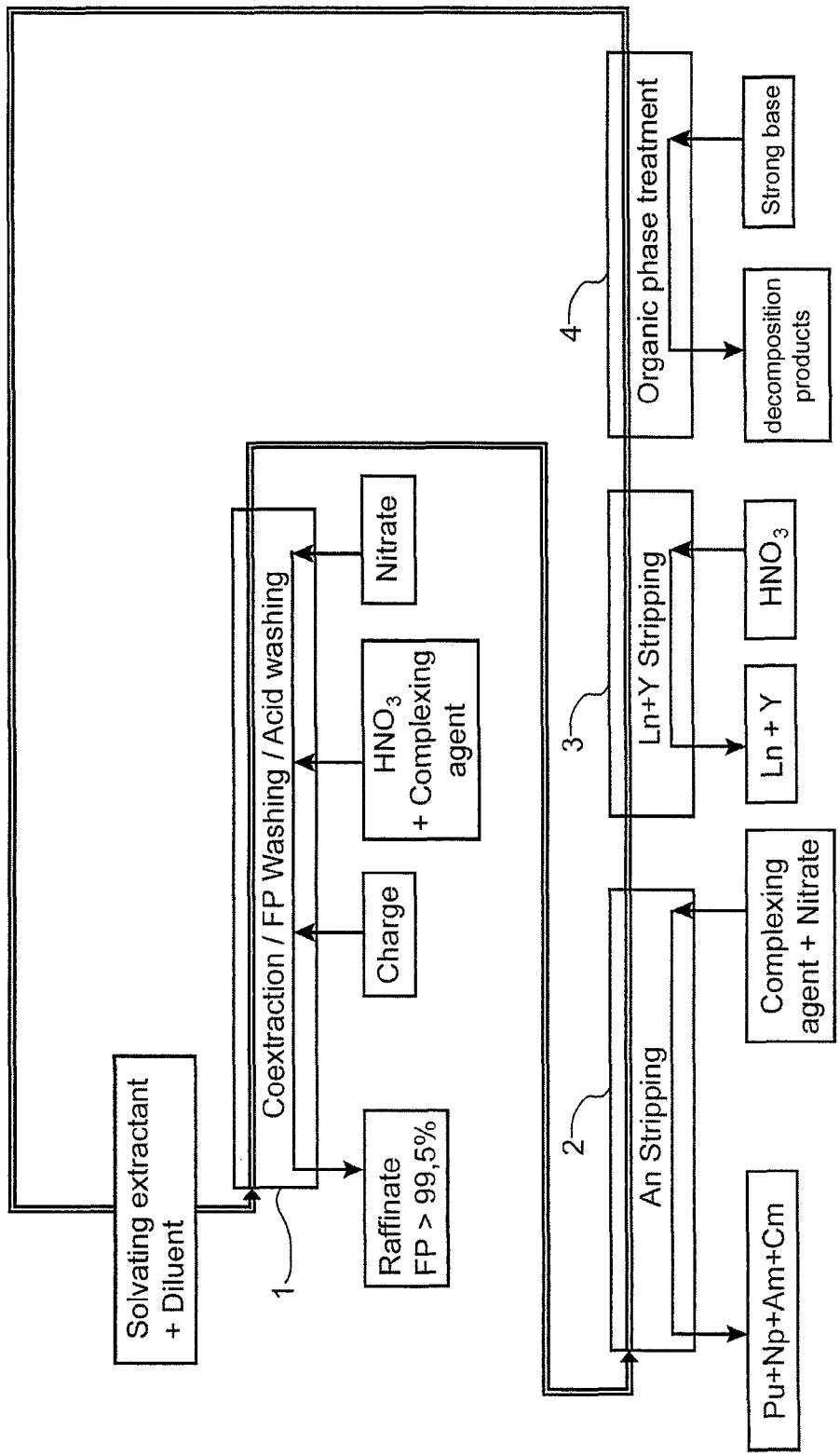
FIG. 2 is a flowsheet of an alternative form of the embodiment shown in FIG. 1.

Reference is now made to FIG. 2, in which an alternative form of the embodiment shown in FIG. 1 is illustrated, in which alternative form the step of stripping the nitric acid (referred to as "Acid washing" in FIG. 2) is coupled with the step of coextraction of the actinides, the lanthanides and yttrium and of washing the organic phase which succeeds it (FP washing), that is to say that it is carried out in the final stages of the extractor 1. Thus, in the final stages of this extractor, the organic phase resulting from the FP washing is brought into countercurrentwise contact with a weakly acidic aqueous phase comprising nitrate ions which can be of the same type as that used in the embodiment illustrated in FIG. 1.

The aqueous phase comprising the stripped nitric acid subsequently dilutes the charge introduced between the stages of the extractor 1 which are allotted to the coextraction of the actinides, the lanthanides and yttrium and those which are allotted to the washing of the organic phase, while the organic phase is directed towards the extractor 2 in order to be subjected to the step for selective stripping of the actinides.

The step for selective stripping the actinides and the following steps take place exactly as in the embodiment shown in FIG. 1.

Example 2

Experimental Validation of the Process According to the Invention

1) Coextraction:
The coextraction was validated experimentally by using:
an organic phase including 0.1 mol/l of TODGA in TPH; and
an aqueous phase composed of a 3M nitric acid solution (which corresponds to the acidity conventionally selected for a solution for the dissolution of an irradiated nuclear fuel) comprising neptunium(IV), plutonium (III), americium and curium as actinides and europium as lanthanide.

All these elements were present in the aqueous phase in the form of traces, that is to say at concentrations of the order of $10^{-5}$ to $10^{-6}$ mol/l, with the exception of neptunium, which for its part was present at a concentration of $1.5 \times 10^{-3}$ mol/l.

In order to stabilize the neptunium and the plutonium in the IV oxidation state and in the III oxidation state respectively, the aqueous nitric acid phase also comprised a mixture of hydroxylamine nitrate and hydrazine nitrate at the respective concentrations of 0.1 mol/l and 0.2 mol/l.

The organic phase, acid equilibrated beforehand with 3M nitric acid, was brought into contact with the aqueous nitric acid phase in a proportion of 1 volume of organic phase per 1 volume of aqueous phase and the mixture was stirred at 25° C. for 1 hour.

After settling and separation of the organic and aqueous phases, the activity concentrations of the various elements were measured in both phases, organic and aqueous, for the purpose of determining their distribution coefficients $D_M$.

The distribution coefficient $D_M$ of an element M corresponds to the ratio of the activity concentration of this element in the organic phase to the activity concentration of this same element in the aqueous phase.

The activity concentrations of plutonium, neptunium and curium were measured by alpha spectrometry, while the activity concentrations of americium and europium were measured by gamma spectrometry.

The distribution coefficients $D_M$ thus obtained are presented in Table I below.

TABLE I

| Elements | Np(IV) | Pu(III) | Am | Cm | Eu |
|---|---|---|---|---|---|
| $D_M$ | 730 | 1400 | 1700 | 630 | >1000 |

This table shows that all the actinides present in the aqueous nitric acid phase have indeed been extracted into the organic phase.

2) Stripping of the Nitric Acid:

The stripping of the nitric acid was validated experimentally by using:

the organic phase obtained on conclusion of the experiment described in part 1) of the present example; and an aqueous phase composed of a 1M aqueous hydroxylamine nitrate solution with a pH of 2.

These two phases were brought into contact in a proportion of 1 volume of organic phase per 1 volume of aqueous phase and the mixture was stirred at 25° C. for 1 hour.

After settling and separation of the organic and aqueous phases, the activity concentrations of the various elements were measured in both phases, organic and aqueous, for the purpose of determining their distribution coefficients $D_M$.

As above, the activity concentrations of neptunium, plutonium and curium were measured by alpha spectrometry and the activity concentrations of americium and europium were measured by gamma spectrometry.

The distribution coefficients $D_M$ thus obtained are presented in Table II below.

TABLE II

| Elements | H$^+$ | Np(IV) | Pu(III) | Am | Cm | Eu |
|---|---|---|---|---|---|---|
| $D_M$ | 0.1 | 20 | 4 | 5 | 9 | 35 |

This table shows that an aqueous phase as described above makes it possible to strip the nitric acid from an organic phase while limiting the losses of actinides in the aqueous phase.

In the embodiment illustrated in FIG. 1, as symbolized by the dotted arrow, the actinides which have been stripped in the aqueous phase during the step of stripping the nitric acid can nevertheless be recovered in an organic phase by adding, to the extractor 2, additional stages in which said aqueous phase is brought into contact, at the end of the battery, with a portion of the discharged organic phase purified from its decomposition products.

In the case of the alternative form illustrated in FIG. 2, the actinides stripped in the final stages of the extractor 1 will be recovered in the organic phase in the stages of this extractor which are allotted to the coextraction of the actinides, the lanthanides and yttrium.

3) Selective Stripping of the Actinides:

The selective stripping of the actinides was validated experimentally by using:

the organic phase obtained on conclusion of the experiment described in part 2) of the present example; and an aqueous phase composed of an aqueous solution of DTPA and hydroxylamine nitrate at the respective concentrations of 0.01 mol/l and 2 mol/l, with a pH of 2.

These two phases were brought into contact in a proportion of 1 volume of organic phase per 1 volume of aqueous phase and the mixture was stirred at 25° C. for 1 hour.

After settling and separation of the organic and aqueous phases, the activity concentrations of the various elements were measured in both phases, organic and aqueous, for the purpose of determining their distribution coefficients $D_M$ and then the separation factors $SF_{Eu/An}$.

The separation factor between two elements M1 and M2, recorded as $SF_{M1/M2}$, is defined as being the ratio between the distribution coefficients, respectively $D_{M1}$ and $D_{M2}$, of these two elements. The separation between the two elements M1 and M2 is regarded as being satisfactory when the separation factor $SF_{M1/M2}$ is greater than 10.

As above, the activity concentrations of plutonium, neptunium and curium were measured by alpha spectrometry, while the activity concentrations of americium and europium were measured by gamma spectrometry.

The distribution coefficients $D_M$ and the separation factors $SF_{Eu/An}$ as obtained for the various elements are presented in Table III below.

TABLE III

| Elements | Np(IV) | Pu(III) | Am | Cm | Eu |
|---|---|---|---|---|---|
| $D_M$ | 0.001 | 0.001 | 0.1 | 0.09 | 1.1 |
| $SF_{Eu/An}$ | >1000 | >1000 | 11 | 12 | 1 |

The table shows that all the actinides have indeed been stripped from the organic phase with a very good selectivity with regard to europium.

REFERENCES CITED

[1] FR-A-2 738 663
[2] Baron P. et al., *Proceedings of the International Conference on Back-End of the Fuel Cycle: From Research to Solutions, GLOBAL '01*, Paris, France, 9-13 Sep. 2001, published by INIS-FR-1108
[3] FR-A-2 810 679
[4] FR-A-2 674 256

The invention claimed is:

1. A process for separating in a grouped manner actinides (III), (IV), (V) and (VI) that are present in a highly acidic aqueous phase with a pH lesser than or equal to 0, from fission products, including lanthanides and yttrium, that are also present in the highly acidic aqueous phase, comprising the following steps:

a) coextracting the actinides(III), (IV), (V) and (VI), the lanthanides, and yttrium from the highly acidic aqueous phase by bringing the highly acidic aqueous phase into contact with a water-immiscible organic phase which comprises at least one solvating extractant chosen from diglycolamides and malonamides in an organic diluent, and by separating the highly acidic aqueous phase from the organic phase; and b) selectively stripping the actinides(III), (IV), (V) and (VI) from the organic phase by bringing the organic phase into contact with a weakly acidic aqueous phase with a pH higher than 0, the weakly acidic aqueous phase comprising at least one complexing agent which complexes the actinides(III), (IV), (V) and (VI) in the weakly acidic aqueous phase, and nitrate ions, and by separating the organic phase from the weakly acidic aqueous phase;

wherein said nitrate ions are present in an amount effective to substantially inhibit co-stripping of lanthanides and yttrium from the organic phase.

2. The process according to claim 1, in which the solvating extractant corresponds to the formula (I) below:

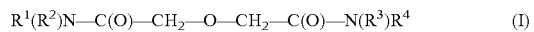

in which $R^1$ to $R^4$, which can be identical or different, are alkyl groups.

3. The process according to claim 2, in which the solvating extractant corresponds to the formula (I) in which $R^1$ to $R^4$, which can be identical or different, are alkyl groups comprising from 3 to 12 carbon atoms.

4. The process according to claim 3, in which the solvating extractant is N,N,N',N'-tetraoctyl-3-oxapentanediamide.

5. The process according to claim 1, in which the solvating extractant corresponds to the formula (II) below:

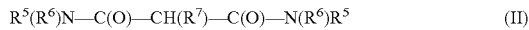

$$R^5(R^6)N-C(O)-CH(R^7)-C(O)-N(R^6)R^5 \quad (II)$$

in which:
$R^5$ and $R^6$, which can be identical or different, represent a linear or branched alkyl group comprising from 1 to 25 carbon atoms or a group of formula (III) below:

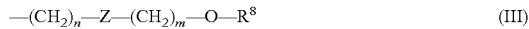

$$-(CH_2)_n-Z-(CH_2)_m-O-R^8 \quad (III)$$

in which $R^8$ is an alkyl group comprising from 1 to 13 carbon atoms, n is an integer ranging from 0 to 6, Z is a single bond or an oxygen atom and m is an integer ranging from 1 to 6, provided that Z is a single bond when n is equal to 0; while $R^7$ represents an alkyl radical comprising from 12 to 25 carbon atoms or a group of formula (III) above in which $R^8$, n, Z and m have the same meanings as above.

6. The process according to claim 5, in which the solvating extractant corresponds to the formula (II) in which $R^7$ represents an alkyl radical comprising from 12 to 25 carbon atoms or a group of formula $-(CH_2)_m-O-R^8$ in which $R^8$ and m have the same meanings as above.

7. The process according to claim 5, in which the solvating extractant is chosen from N,N'-dimethyl-N,N'-dibutyltetradecyl-malonamide, N,N'-dimethyl-N,N'-dibutyldodecyl-malonamide and N,N'-dimethyl-N,N'-dioctylhexylethoxy-malonamide.

8. The process according to claim 1, in which the organic diluent is chosen from toluene, xylene, t-butylbenzene, triisopropylbenzene, kerosene and linear or branched dodecanes, and mixtures thereof.

9. The process according to claim 1, in which the organic phase used in step a) further comprises a dialkylmonoamide or a trialkyl phosphate.

10. The process according to claim 1, in which the highly acidic aqueous phase used in step a) comprises at least one complexing agent for inhibiting the coextraction of certain fission products.

11. The process according to claim 1, in which step a) further comprises washing the organic phase issued from the coextraction, by bringing the organic phase into contact with a highly acidic aqueous phase with a pH lesser than or equal to 0, the highly acidic aqueous phase comprising at least one complexing agent, and by separating the organic phase from the highly acidic aqueous phase.

12. The process according to claim 10, in which the complexing agent is chosen from pyridinepolycarboxylic acids, polyaminocarboxylic acids, carboxylic acids, hydroxycarboxylic acids, hydrophilic polypyridines, dithiophosphonic acids, amines, polyazines grafted with alkyl chains comprising from 1 to 8 carbon atoms, hydroxyoximes, sulphonic acids, hydroxamic acids and β-diketones.

13. The process according to claim 1, in which the highly acidic aqueous phase used in step a) comprises at least one reducing agent.

14. The process according to claim 13, in which the reducing agent is chosen from alkylated derivatives of hydrazine, alkylated derivatives of hydroxylamine and ferrous sulphamate.

15. The process according to claim 1, in which the weakly acidic aqueous phase used in step b) exhibits a pH of 1 to 4.

16. The process according to claim 1, in which the weakly acidic aqueous phase used in step b) exhibits a concentration of nitrate ions of 1 to 5 mol/l.

17. The process according to claim 1, in which the complexing agent present in the weakly acidic aqueous phase used in step b) is chosen from pyridinepolycarboxylic acids, polyaminocarboxylic acids, carboxylic acids, hydroxycarboxylic acids, hydrophilic polypyridines, dithiophosphonic acids, amines, polyazines grafted with alkyl chains comprising from 1 to 8 carbon atoms, hydroxyoximes, sulphonic acids, hydroxamic acids and β-diketones.

18. The process according to claim 17, in which the complexing agent is N-(2-hydroxyethyl)-ethylenediaminetriacetic acid or diethylenetriamine-pentaacetic acid.

19. The process according to claim 1, in which the weakly acidic aqueous phase used in step b) further comprises a buffer.

20. The process according to claim 1, further comprising, between step a) and step b), a step of stripping the acid present in the organic phase issued from step a), by bringing the organic phase into contact with a weakly acidic aqueous phase with a pH higher than 0, the weakly acidic aqueous phase comprising nitrate ions and being devoid of any agent capable of complexing actinides(III), (IV), (V), or (VI), and by separating the organic phase from the weakly acidic aqueous phase.

21. The process according to claim 20, in which step a) and the step of stripping the acid are carried out in the same column or battery of extractors.

22. The process according to claim 20, in which the weakly acidic aqueous phase used in the step of stripping the acid exhibits a pH of 1 to 3.

23. The process according to claim 20, in which the weakly acidic aqueous phase used in the step of stripping the acid exhibits a nitrate concentration of 0.1 to 3 mol/l.

24. The process according to claim 1, in which the nitrate ions are nitrate ions of a salt chosen from alkali metal nitrates and organic amine nitrates.

25. The process according to claim 24, in which the nitrate ions are nitrate ions of hydroxylamine nitrate or hydrazine nitrate.

26. The process according to claim 1, further comprising a step of stripping the lanthanides and yttrium from the organic phase issued from step b).

27. A process for the reprocessing of an irradiated nuclear fuel, including separating in a grouped manner actinides(III), (IV), (V) and (VI) that are present in a highly acidic aqueous phase with a pH lesser than or equal to 0 from fission products, including lanthanides and yttrium, that are also present in the highly acidic aqueous phase, comprising the following steps:
a) coextracting the actinides(III), (IV), (V) and (VI), the lanthanides and yttrium from the highly acidic aqueous phase by bringing the highly acidic aqueous phase into contact with a water-immiscible organic phase which comprises at least one solvating extractant chosen from diglycolamides and malonamides in an organic diluent, and by separating the highly acidic aqueous phase from the organic phase; and
b) selectively stripping the actinides(III), (IV), (V) and (VI) from the organic phase by bringing the organic phase into contact with a weakly acidic aqueous phase with a pH higher than 0, the weakly acidic aqueous phase comprising at least one complexing agent which complexes the actinides(III), (IV), (V) and (VI) in the weakly acidic aqueous phase, and nitrate ions, and by separating the organic phase from the weakly acidic aqueous phase;

wherein said nitrate ions are present in an amount effective to substantially inhibit co-extraction of lanthanides and yttrium into the weakly acidic aqueous phase.

28. The process according to claim 27, in which plutonium, neptunium, americium, curium and possibly uranium are recovered in a pooled but selective fashion with regard to the fission products, from a solution derived from dissolution of an irradiated nuclear fuel, downstream of a cycle for the extraction of uranium.

29. The process according to claim 27, in which the weakly acidic aqueous phase used in step b) exhibits a concentration of nitrate ions of 1 to 5 mol/l.

* * * * *